United States Patent [19]
Glatthorn

[11] 4,103,140
[45] Jul. 25, 1978

[54] PNEUMATIC HAMMER AND WELDER

[75] Inventor: Raymond H. Glatthorn, St. Petersburg, Fla.

[73] Assignee: Westinghouse Electric Corp., Pittsburgh, Pa.

[21] Appl. No.: 775,675

[22] Filed: Mar. 8, 1977

[51] Int. Cl.² .............................................. B23K 9/12
[52] U.S. Cl. ............................ 219/125.11; 219/60 A
[58] Field of Search ........... 219/125 R, 125 PL, 60 A

[56] References Cited

U.S. PATENT DOCUMENTS 3,777,110  12/1973  Yohn ................................. 219/125 R
3,927,295  12/1975  Schuster .......................... 219/125 R Primary Examiner—E. A. Goldberg
Attorney, Agent, or Firm—F. J. Baehr, Jr.

[57] ABSTRACT

An apparatus for serially driving a tapered plug in a tube and forming a peripheral seal weld at the juncture between the plug and the tube.

10 Claims, 2 Drawing Figures

PNEUMATIC HAMMER AND WELDER

BACKGROUND OF THE INVENTION

This invention relates to a combination pneumatic hammer and welder and, more particularly, to such a tool which can be remotely operated.

Pressurized water nuclear reactors utilize a steam generator to transfer heat from the primary fluid which cools the reactor to a secondary fluid which is vaporized to form steam that drives a steam turbine. While tubes of the steam generator are made of corrosion resistant alloys, they still fail and leak. To prevent primary fluid, which contains contaminants that are radioactive, from mixing with the secondary fluid, tubes that develop leaks are removed from service by plugging. As the number of tubes to be plugged has increased, to reduce the exposure of personnel to radioactive residues that remain in the steam generator after it has been drained, apparatus which fits into the head of the steam generator has been developed. During this development program, it became apparent that tools, which can perform multiple operations would substantially reduce the time required for repair and result in less downtime for the reactor.

SUMMARY OF THE INVENTION

In general, apparatus for driving a tapered plug into a tube and for forming a seal weld between the tube and the plug, when made in accordance with this invention, comprises a spindle having an axially located cavity, a pneumatic hammer disposed in this cavity, and a chisel adapted to receive a tapered plug. The chisel extends through a portion of the spindle and is received by the pneumatic hammer. A welding torch is eccentrically disposed on the spindle and a device for rotating the spindle is also attached thereto so that the apparatus can drive a tapered plug into a tube and form a peripheral seal weld at the outer juncture of the plug and tube in successive operations.

BRIEF DESCRIPTION OF THE DRAWINGS

The objects and advantages of this invention will become more apparent from reading the following detailed description in connection with the accompanying drawings, in which.

DESCRIPTION OF THE PREFERRED EMBODIMENT

Figure 1:
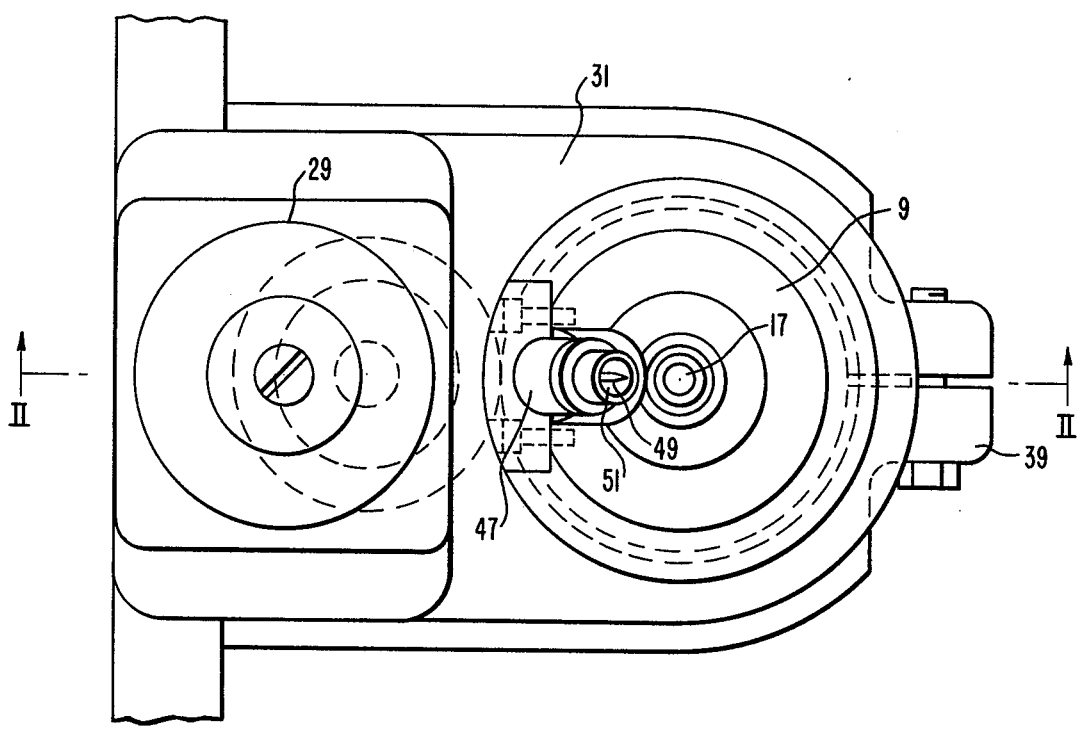
FIG. 1 is a plan view of an apparatus for driving a tapered plug in a tube and for forming a seal weld at the juncture between the plug and the tube.
Figure 2:
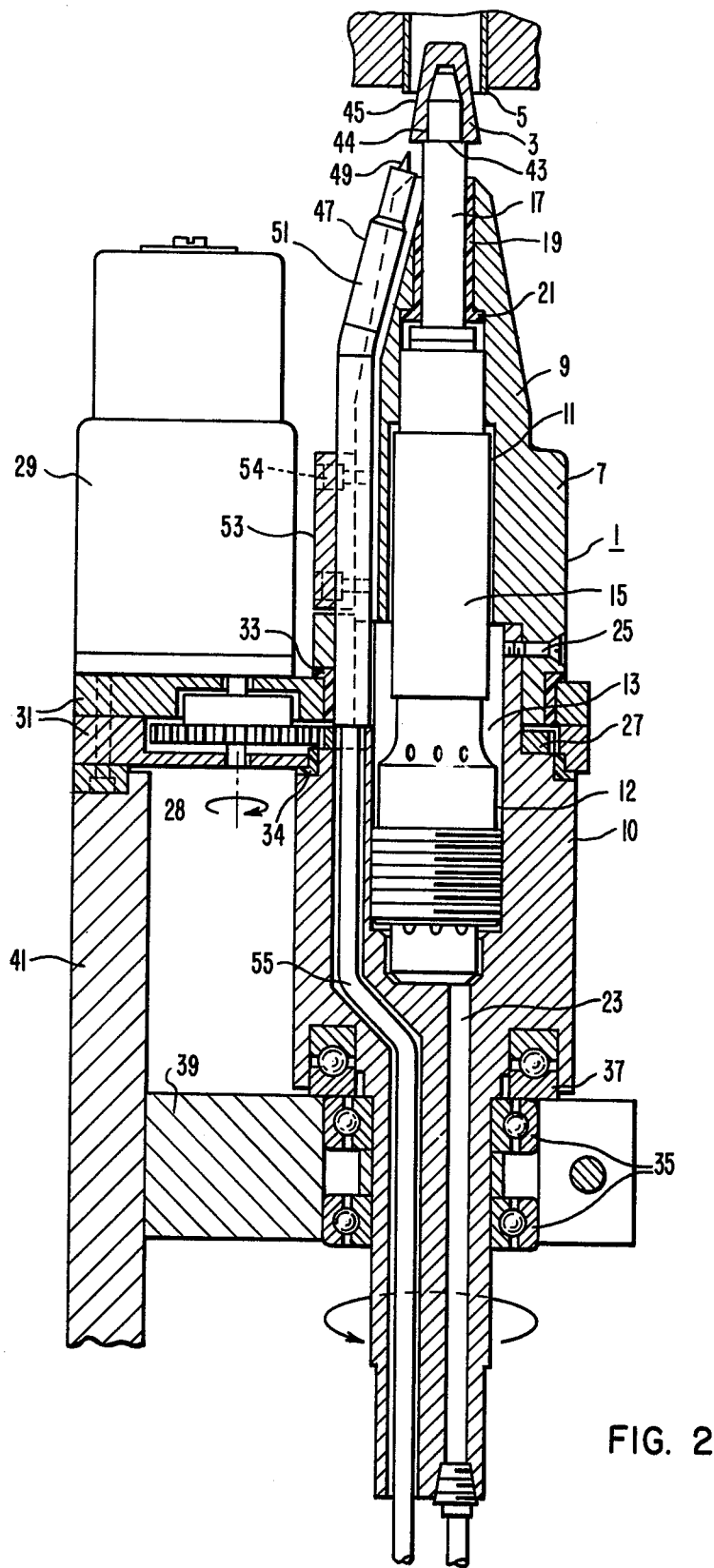
FIG. 2 is a partial sectional view taken on line II—II of FIG. 1.

Referring now the drawings in detail and in particular to FIGS. 1 and 2, there is shown an apparatus 1 for driving a tapered plug 3 into a tube 5 and forming a seal weld at the juncture between the plug 3 and tube 5.

The apparatus 1 comprises a spindle 7 having two portions, an upper portion 9 and a lower portion 10. Each portion 9 and 10 has an axially disposed counter bore 11 and 12, respectively, which register to form a centrally located cavity 13 within the spindle 7. The counter bore 12 is threaded to receive the internals of a pneumatic hammer 15 such as Model 2Z487 manufactured by Dayton Electric Manufacturing Company of Chicago, Ill. The pneumatic hammer 15 receives a chisel 17 which extends through the upper portion 9 of the spindle 7. A hardened bushing 19 having a flange 21 on one end is disposed in the opening through which the chisel 17 passes in order to reduce the wear as the chisel is reciprocated by the pneumatic hammer 15 and to prevent damage to the upper portion 9 of the spindle 7 when the chisel 17 strikes the flanged portion 21 as the pneumatic hammer 17 is operated without a load. A fluid supply conduit 23 is disposed in the lower portion 11 of the spindle 7 to provide pneumatic fluid to the pneumatic hammer 15.

The upper and lower portions 9 and 10 are fastened together by a machine screw 25 or other means. A spur gear 27 is disposed on the lower portion 10 of the spindle 7 and meshes with a spur gear 28 which is driven by an electric motor and reduction gear drive 29 or other driving means. The gears 27 and 28 are enclosed in a split housing 31 and the upper and lower portions 9 and 10 of the spindle 7 are adapted to be captured by the housing 31 to prevent axial movement therebetween. Bushings 33 and 34 are provided to allow rotation of the spindle 7 within the housing 31. A pair of ball bearings 35 and a thrust bearing 37 are disposed on the bottom portion of the lower portion 10 of the spindle 7 and are mounted on a bracket 39, which clamps to the outer race of the bearings 35 to rotatably support the spindle 7. The thrust bearing 37 abuts the bracket 39 to support the thrust load of the spindle 7. The bracket 39 has a plate 41 extending therefrom. The plate 41 connects the bracket 39 to the gear housing 31 to facilitate rotation of the spindle 7.

The chisel 17 has a shoulder 43 adjacent the distal end and the tapered plugs 3 have holes 44 which slide over the end of the chisel 17 and abut the shoulder 43. The plugs 5 also have a frustoconical portion 45 which tapers inwardly from the end with the hole 44.

A welding torch 47 is mounted on the spindle 7. The torch 47 has a tungsten or other non-consumable electrode 49 and a duct 51 encircling the electrode 49 for supplying inert gas to the area adjacent the tip of electrode 49 to shield an arc produced during the welding operation. While non-consumable electrodes are preferred, consumable electrodes may be utilized. The tip of the electrode 49 is disposed adjacent the shoulder 43 on the chisel 17 so that the arc will be formed adjacent the periphery of the plug 5 to form a weld between the plug 3 and the tube 5 as the spindle is rotated approximately 360° by the motor 29.

The torch 47 is fastened to the upper portion 9 of the spindle 7 by a cover plate 53 which is attached to the spindle 7 by machine screws 54 or other means. A duct 55 is disposed in the lower portion of the spindle 7 and the electric and inert gas supplies for the torch 47 run through the duct 55.

The apparatus hereinbefore described automatically performs serial or successive operations of driving a plug 3 into a tube 5 and forming a seal weld at the juncture of the plug and tube and thereby reduces the time required to plug a tube and it so reduces the exposure of operators to radioactive contaminants within the steam generator.

What is claimed is:

1. Apparatus for driving a tapered plug into a tube and forming a seal weld therebetween, said apparatus comprising a spindle having a axially located cavity, a pneumatic hammer disposed in said cavity, a chisel adapted to receive said tapered plug, said chisel extending through a portion of said spindle and being received by said pneumatic hammer, a welding torch eccentrically disposed on said spindle, and means for rotating said spindle, whereby said apparatus can drive the tapered plug into the tube and form a peripheral seal weld at the outer juncture of the plug and tube in serial operations.

2. The apparatus as set forth in claim 1, wherein said welding torch has a tungsten electrode and means for supplying inert gas to an area adjacent said electrode.

3. Apparatus as set forth in claim 1, wherein the means for rotating the spindle comprises drive means, a first gear fastened to said drive means and a second gear fastened to said spindle.

4. Apparatus as set forth in claim 3, and further comprising a bracket to which the drive means is attached and a plurality of bearings disposed between said bracket and said spindle.

5. Apparatus as set forth in claim 4, wherein one of said bearings is a thrust bearing.

6. Apparatus as set forth in claim 5, wherein the gears engage and have a housing and the spindle is rotatably disposed in said housing.

7. Apparatus as set forth in claim 6, wherein the spindle has a bushing which rotates within said housing and the spindle and bushing cooperate to capture said spindle in said housing and allow said spindle to rotate freely within said housing.

8. The apparatus as set forth in claim 1, wherein the spindle has a hardened bushing disposed therein and the chisel passes through the hardened bushing in order to prevent wear and to prevent the chisel from damaging the spindle.

9. Apparatus as set forth in claim 1, wherein the spindle is formed from two portions each having an axially disposed counter bore, the counter bores registering to form the cavity for the pneumatic hammer.

10. Apparatus as set forth in claim 1, wherein the means for rotating the spindle rotates it approximately 360°.

* * * * *